Jan. 14, 1930.  C. S. COLE  1,743,881
SPARK PLUG TESTER
Filed Dec. 15, 1927

WITNESSES

INVENTOR
Carman S. Cole
BY
ATTORNEY

Patented Jan. 14, 1930

1,743,881

UNITED STATES PATENT OFFICE

CARMAN S. COLE, OF PENDLETON, OREGON

SPARK-PLUG TESTER

Application filed December 15, 1927. Serial No. 240,272.

My invention relates to a testing device for spark plugs and has for its general object to provide a spark plug tester which may be employed to test the spark under substantially the same degree of compression as it will be subjected to in practice, whereby the tester will indicate defects of the spark plug which ordinarily will not show up or be indicated when the plug is tried out or tested when not under compression.

My present invention is particularly designed as an improvement on the spark plug tester forming the subject matter of application for United States patent filed by me March 22, 1927, Serial No. 177,387.

The general object of my present invention is to improve the spark plug tester shown in my former application referred to with a view to the elimination of exterior pipes and by-passes and to otherwise make the spark plug tester small and compact.

The feature characterized in both inventions is an assemblage characterized by the fact that the cylinder of the air pump constitutes the handle of the tester.

The nature of my invention and its distinctive features and advantages will more clearly appear as the description proceeds.

Reference is to be had to the accompanying drawings forming a part of this specification, it being understood that the drawings are merely illustrative of one example of the invention.

Figure 1:
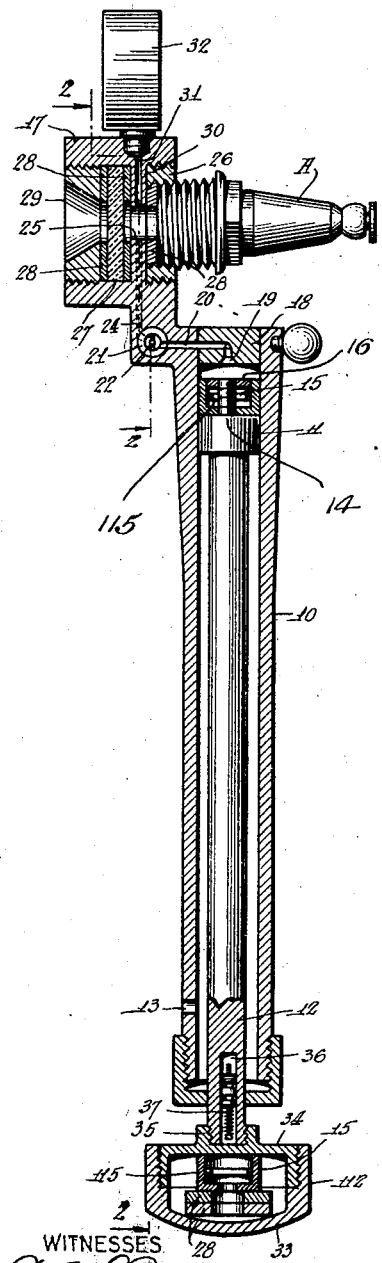
Figure 2:
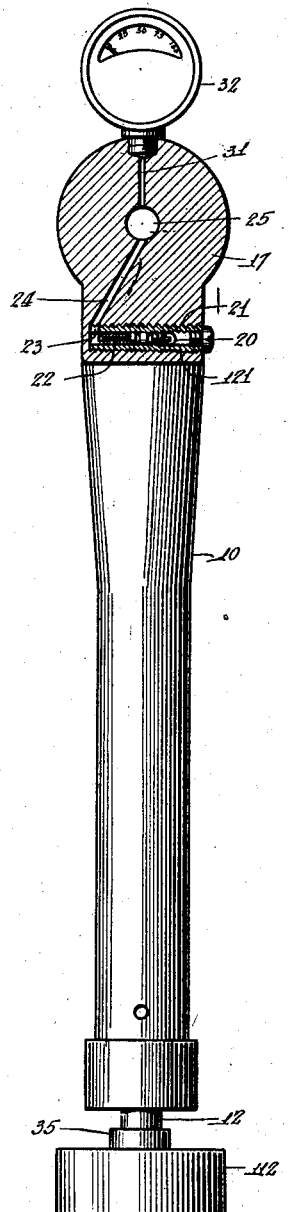

Figure 1 is a vertical longitudinal section of a spark plug tester embodying my invention; and Figure 2 is a view partly in elevation and partly in section on the line 2—2 of Figure 1.

In carrying out my invention in accordance with the illustrated example a pump cylinder 10 is provided in which operates a plunger 11, the rod 12 of which has a suitable handle 112 for operating the plunger. The numeral 13 indicates the air inlet of the pump. The plunger 11 has a seat 14 at the top for the cup leather 15 held by nut 16.

Rigid on the pump cylinder 10 is a head 17. In the cylinder head 18 is an air discharge port 19 which is therefore in front of the plunger 11 and cup leather 15.

An air passage 20 leads from the discharge port 19 to and through the side of housing 21 fitted in a transverse bore 121 in the head 17, said housing containing a check valve 22, here shown as of known form and corresponding with a well known tire valve. The housing 21 has a transverse air port 23 leading to a passage 24 which discharges to a chamber 25. On one side of said chamber 25 is an internally and externally threaded bushing 26 in head 17, the internal threads of said bushing being adapted to receive the spark plug A, here shown of the type supplied on aeroplane engines. At the opposite side of the head 17 from the bushing 26 and spark plug A is lens 27 on the front of chamber 25 to observe sparking of the plug A. Said lens 27 is disposed between washers 28, and the assemblage composed of lens 27 and washers 28 is sustained in place by ringed nut 29 in the internally threaded open front end of head 17. Said head 17 has discs 30 constituting electrodes presenting an opening to receive the sparking electrode on spark plug A.

It is to be observed that in accordance with the present invention the passage 20, the bore 121, port 23, passage 24, and chamber 25 are all formed in the material of the head 17 except that the passage 20 is partially in the head 110 of cylinder 10. The arrangement does away with all internal by-passes and connecting pipes between the discharge passage 19 and the chamber 25.

From the foregoing description and the drawing of the assemblage it will be seen that air from the discharge port 19 of the pump cylinder will pass by passage 20, housing 21, port 23, passage 24 to chamber 25. Chamber 25 in practice connects by passage 31, also formed in head 17, with pressure gauge 32 so that pressure in the chamber 25 will register in said gauge 32. Pressure may thus be developed in the chamber 25 and therefore at the terminals of the electrodes of the spark plug and head 17 in accordance with the pressure at which the plug is used in practice and the functioning of the spark plug may be observed through lens 27.

It is to be noted furthermore that the cylinder 10 is in the form of a handle for the described spark plug tester, making the device completely portable and very convenient of manipulation as well as lending great compactness to the device.

The head 112 constituting the handle is hollow and a movable cap portion 33 is screwed to the flanged front 34 of said head 112. The front 34 is detachably secured by threaded nipple 35 to the rear end of rod 12 of the piston or plunger 11.

The numeral 115 indicates an expansion spring within the cup leather 15. It will be noted from Figure 1 that an extra cup leather 15, an extra spring 115, and extra washers 28 are housed in the head 112 of rod 12. Moreover said rod 12 has an axial bore 36 in the rear end forming a chamber to contain an extra valve 37.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claim.

I claim:

In a spark plug tester, a pump cylinder, a plunger operated in said cylinder, a head rigid with said cylinder in the front end, said cylinder forming a handle for the head and having a discharge port, and said head having a chamber therein as well as an air passage leading from said discharge port of the cylinder, a housing emplaced transversely in said head and presenting a bore to which said air passage leads, said housing having an air port therein, and said head having a passage establishing communication between said last mentioned port and the said chamber of the head, said chamber having a sight opening at the front, and means at the back to receive a spark plug.

Signed at Pendleton in the county of Umatilla and State of Oregon this 18th day of October, A. D. 1927.

CARMAN S. COLE.